United States Patent [19]

Koishi et al.

[11] Patent Number: 4,546,462

[45] Date of Patent: Oct. 8, 1985

[54] OPTICAL DATA RECORDING AND REPRODUCING APPARATUS

[75] Inventors: Kenji Koishi, Hyogo; Tomio Yoshida, Katano; Isao Satoh, Neyagawa; Shunji Ohara, Higashiosaka, all of Japan

[73] Assignee: Matsushita Electric Industrial Co., Ltd., Osaka, Japan

[21] Appl. No.: 446,007

[22] Filed: Dec. 1, 1982

[30] Foreign Application Priority Data

Dec. 4, 1981 [JP] Japan .............................. 56-196048
Jul. 22, 1982 [JP] Japan .............................. 57-128395
Oct. 8, 1982 [JP] Japan .............................. 57-177949

[51] Int. Cl.$^4$ ....................... G11B 15/02; G11B 27/00
[52] U.S. Cl. ......................................... 369/53; 369/58
[58] Field of Search ............... 369/45, 53, 54, 58, 369/59; 365/200; 358/336; 360/53

[56] References Cited

U.S. PATENT DOCUMENTS 4,214,280  7/1980  Halfhill et al. ...................... 360/53
4,325,134  4/1982  Langley et al. ..................... 369/58

Primary Examiner—Robert L. Richardson

Attorney, Agent, or Firm—Stevens, Davis, Miller & Mosher

[57] ABSTRACT

An optical data recording and reproducing apparatus for recording digital data in a recording track on an optical recording disc. The apparatus includes a light illuminating unit for condensing an output light beam from a light source and for illuminating the disc, a recording-reproducing unit for recording and reproducing the digital data by a recording light beam and a reproducing light beam from the light illuminating unit, a dropout detecting and inspecting unit, and a recording-prohibited sector detecting unit to produce an output signal identifying a recording-prohibited sector where recording is prohibited responsive to an output signal from the dropout detecting and inspecting unit. The sector address of a recording-prohibited sector is recorded at least until recording of digital data in the recording track on the optical disc is begun. A comparator unit compares the sector address of the recording-prohibited sector with a sector address read continuously from the disc. The comparator generates a coincidence output signal which prohibits any output from the recording light beam, thus preventing any recording until the next sector on the disc is encountered.

11 Claims, 21 Drawing Figures

FIG. 6A
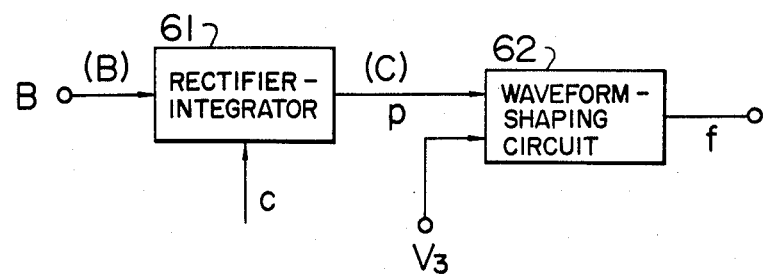
FIG. 6B
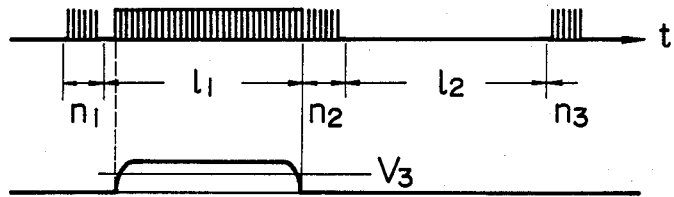
FIG. 6C

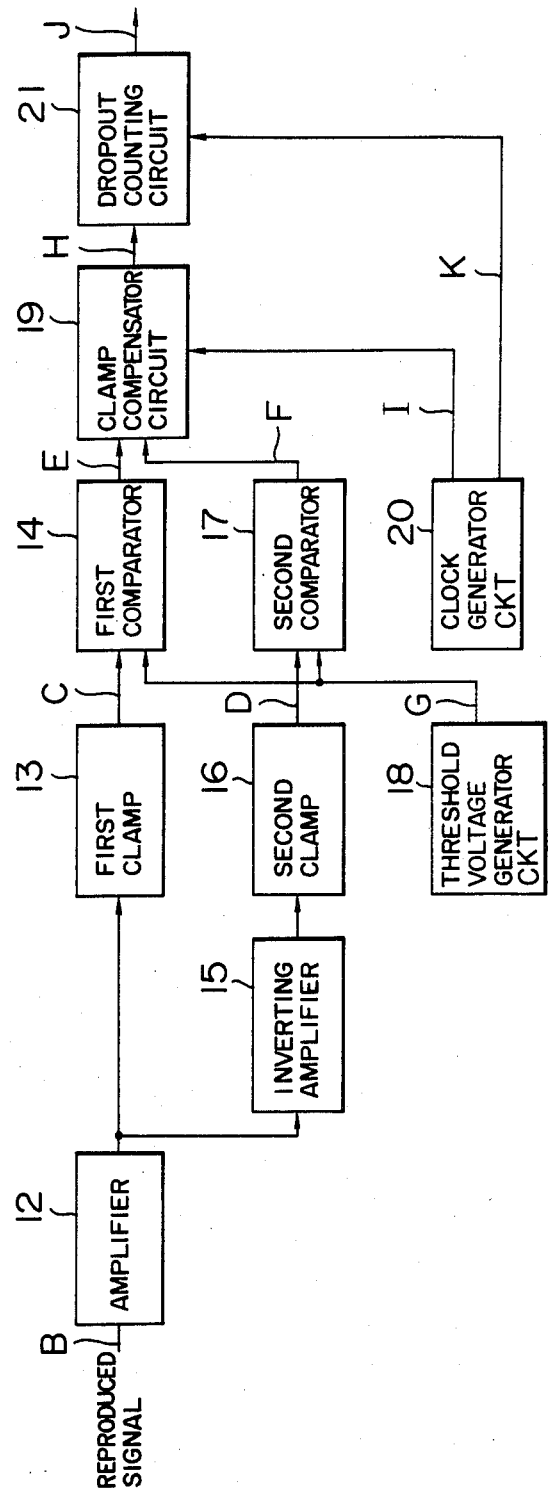

(i) FIRST CLAMP INPUT (ii) FIRST CLAMP OUTPUT (iii) SECOND CLAMP INPUT (iv) SECOND CLAMP OUTPUT

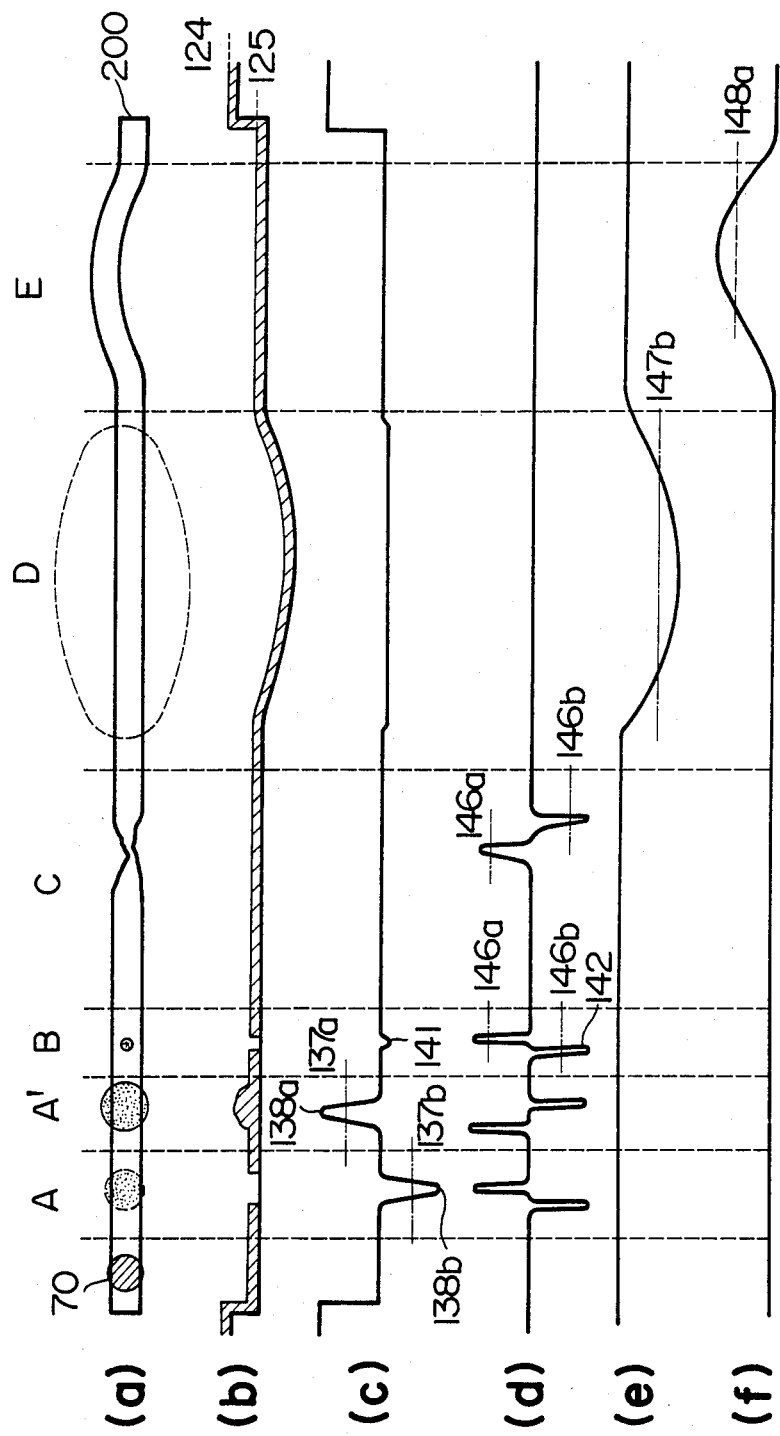

OPTICAL DATA RECORDING AND REPRODUCING APPARATUS

The present invention relates to an optical data recording and reproducing apparatus for recording digital data in and reproducing the recorded digital data from a disc on which signals can be optically recorded and reproduced.

In recording signals in a master video disc, it is a common practice to record or reproduce the signals with high density on an optical recording disc by reducing the diameter of a light beam such as a laser beam to less than 1 $\mu$m. Also, with the development of new optical recording materials, digital signals or video signals are optically recorded or reproduced on an optical disc. Further, in order to record or reproduce signals with high density by a simple device, a disc having an optically detectable guide track is used to record or reproduce signals along or in the guide track. As an example of such a guide track, the use of a groove has been recommended which has a depth equivalent to about one fourth of the wavelength of the light of the light source used for recording and reproduction and a width of 0.5 to 1 $\mu$m. This groove is arranged at an appropriate track pitch spirally or concentrically over the whole surface of a signal-recording region of the disc. In another example of the guide track, signals are recorded or reproduced along a servo track recorded with a servo signal in advance.

An example of an optical recording disc is shown in FIG. 1. In FIG. 1, a single signal recording track is shown for simplification. Reference character N designates an address signal recorded in advance to indicate a specific address number for discriminating the particular signal recording track from the other tracks. Character $n_1, n_2, \ldots, n_m$, each designates a sector address signal recorded to indicate a sector address specific to each sector for using the signal recording track by dividing it into a multiplicity of sectors. Characters $l_1, l_2, \ldots, l_m$ each designates a data recording region in which the necessary data signal corresponding to each sector address is recorded or reproduced. The arrow indicates the direction of rotation of the disc.

In recording or reproducing digital signals in each sector of a disc, various methods have been suggested to assure the recording quality. One method is the DRAW (direct read after write) process. In this method, two light beams used for recording or reproducing in the disc are provided and are arranged in very close proximity to each other (say, 5 to 10 $\mu$m) on the same track. Recording is made by one light beam while the other light beam is used to read out and reproduce the recorded signal instantaneously, thereby checking to see whether the recording has been made correctly. If the reproduced signal contains an error, the same signal is recorded again in the next sector. The two light beams are in many cases generated from a pair of light sources of different wavelengths to prevent confusion of the recording light with the reproducing light. If light beams of the same wavelength are used for recording and reproduction, the light beams for recording and reproduction are difficult to separate from each other or, if they can be, separated, a complicated optical system is required. A possible alternative is to provide two optical heads, one for recording and the other for a reproduction check. In this case, the recording light beam and the reproducing light beam are arranged in considerably spaced relation from each other (for example, 90° or 180° on the disc) due to the limitation of reduction of the physical size of the recording head and the reproducing head. This makes it impossible to read out and check the recorded signals immediately, so that the resulting delay time of waiting for disc rotation before checking after recording or the time of disc rotation before writing the same data in the next sector after an error detection extremely reduces the average data transfer speed for recording data. Also, with the increase in the number of sectors for each track rotation, the average transfer speed is reduced.

On the other hand, assume that the recording, reproduction and checking are made by a single light beam. After confirming the sector address $n_1$ in FIG. 1, data is written in the data recording region $l_1$, for instance, after which the data of the data recording region $l_1$ is reproduced and checked upon a rotation of the disc, and if the data contains any error, the same data may be written again in the data recording region $l_2$. In this method, the construction is simpler than the aforementioned method involving two optical heads, but the average speed of data transfer decreases further. Also, with the increase in the number of sectors for each track rotation, the average data transfer speed decreases.

Several methods for assuring the quality of the recorded data are described above. Apart from this, data should not be recorded doubly in each sector of the optical disc. Otherwise, the previously recorded data would be destroyed, thus posing a practical problem. Before recording data in a specific sector, therefore, it is necessary to make sure that a signal has not already been recorded in the particular sector. If this function is taken into consideration in the DRAW process, the average data transfer speed is further decreased.

Accordingly, it is an object of the present invention to provide an optical data recording and reproducing apparatus in which data can be recorded and reproduced without reducing the average data transfer speed thereof while at the same time assuing the recording quality and preventing double recording.

According to the present invention, there is provided an apparatus for recording and reproducing digital data in an optical recording disc including a plurality of sectors. An optical recording disc generally has the disadvantage of containing dropouts which reduce the envelope of the recorded or reproduced signal and causes a demodulation error. In order to assure the quality of the recorded data, it is important to check for a dropout in a sector before recording and to record data by skipping the sectors having a dropout. By doing so, the recording and reproduction are effected while assuring the recording quality without reducing the average data transfer speed on the one hand, and the sector check prevents double recording by detecting any recorded sector on the other hand. Further, a sector where the recording of new data is to be begun is detected at the same time.

According to another aspect of the present invention, a dropout is detected not only from a reproduced signal detected in the form of a change of the total quantity of light reflected from the disc, but also from a focus error signal and a differential output signal obtained by a light detector having split surfaces parallel and perpendicular to the track for receiving a far field pattern of the reflected light. This permits accurate detection of dropouts attributable to a change of disc groove shape, focus, a hole or a dent incapable of being followed by the tracking servo, or a deformation due to out-of-roundness of the track. In this way, dropouts of any form are accurately detected, thereby improving the reliability of the recording operation.

The present invention will be apparent from the following description taken in conjunction with the accompanying drawings, in which:

FIG. 6A is a block diagram specifically showing an envelope detector circuit;

FIGS. 6B and 6C are diagrams showing waveforms produced at various parts of the envelope detector circuit;

FIG. 7 shows an example of the construction of the dropout detector circuit.

Figure 14:
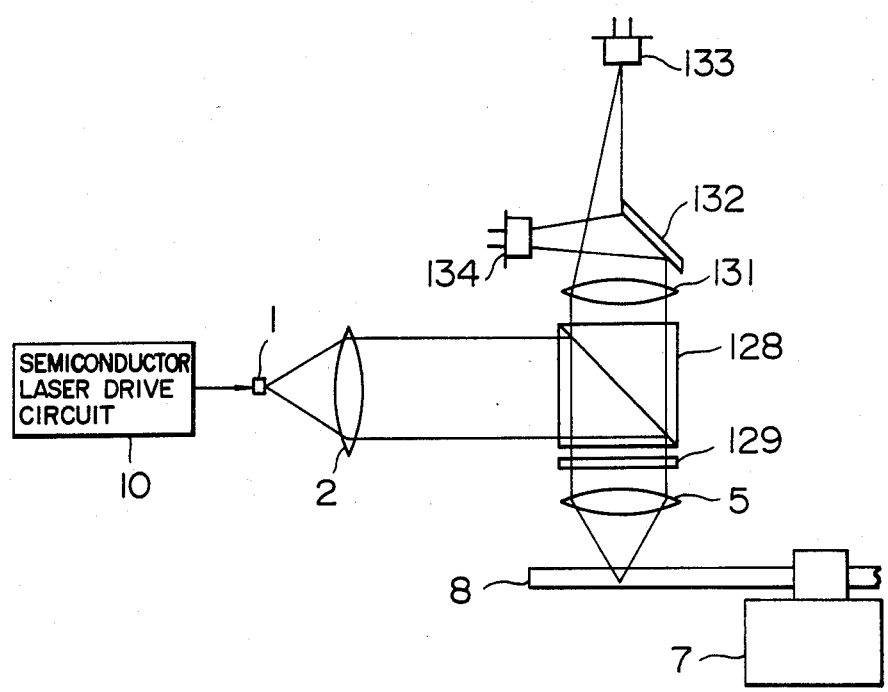
Figure 15A:
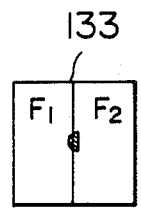
Figure 15B:
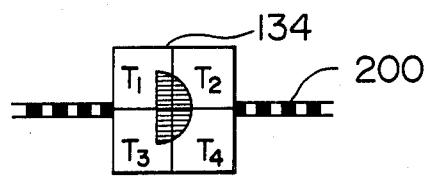
Figure 16:
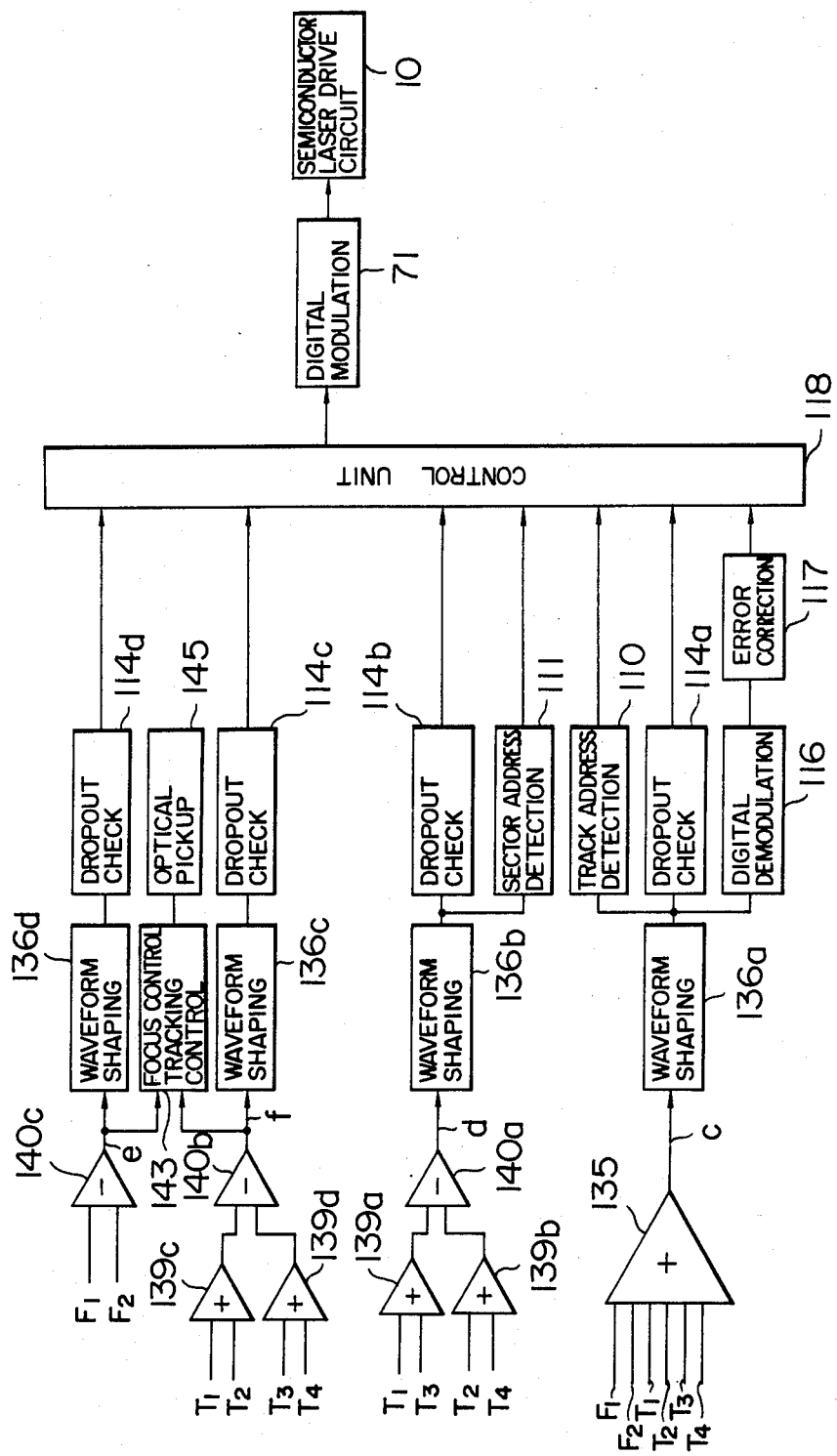

FIG. 13(a)-(c) is a diagram illustrating forms of dropouts;

FIG. 14 is a diagram showing the construction of an optical system of an optical data recording and reproducing apparatus according to an embodiment of the present invention;

FIG. 15a-b is a diagram showing the construction of an optical detector of the optical data recording and reproducing apparatus according to an embodiment of the present invention;

FIG. 16 is a diagram showing the construction of the signal processing section of the optical data recording and reproducing apparatus according to an embodiment of the present invention; and FIG. 17(a)-(f) is a diagram showing forms of dropout and signal waveforms produced at the points c to f in FIGS. 16.

A first embodiment of the present invention will be explained below with reference to the accompanying drawings.

Figure 1:
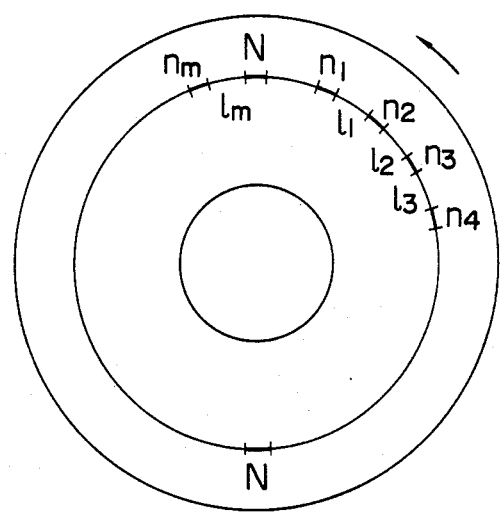
FIG. 1 is a diagram schematically showing an example of the format of an optical recording disc capable of recording and reproduction.
Figure 2:
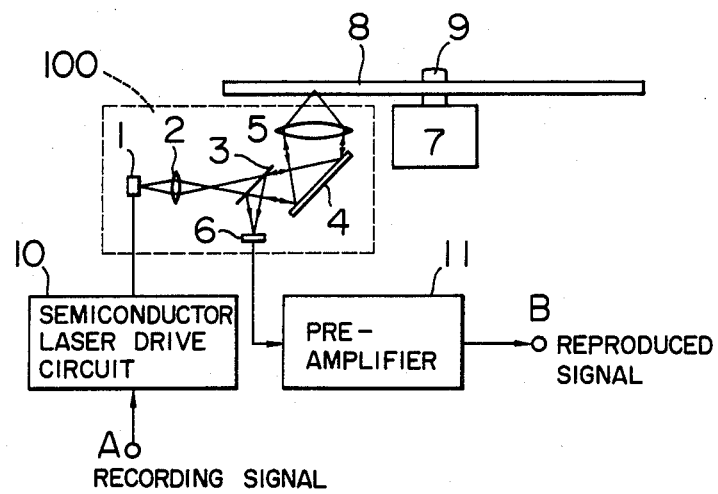
FIG. 2 is a diagram showing a construction of the optical data recording and reproducing apparatus according to an embodiment of the present invention.

The construction of an optical data recording and reproducing apparatus is shown schematically in FIG. 2. Reference numeral 1 designates a light source such as a semiconductor laser (L.D.). Numeral 2 designates a condensing lens, numeral 3 a beam splitter, 4 a tracking mirror and numeral 5 a stop lens. The stop lens 5 reduces the light of the semiconductor laser 1 to a light beam of about 1 $\mu$m in diameter on the disc 8. Numeral 6 designates a photo detector (P.D.) for detecting the reflected light from the disc 8 and converting it into an electrical signal. Numeral 7 designates a disc motor for rotating the disc 8 at a predetermined speed. A disc such as that shown in FIG. 1 is used as the disc 8. Numeral 9 designates a rotary shaft. Numeral 10 designates a semiconductor laser drive circuit for switching the optical output of the semiconductor laser 1 according to recording or reproduction or optically modulating it by the data of one sector. The terminal A of the circuit 10 is supplied with a recording signal as an input. Numeral 11 designates a preamplifier for amplifying the output of the photo detector 6 and generating a reproduced signal at a terminal B. In FIG. 2, the section defined by a dotted line and designated 100 will hereinafter be referred to as the optical head.

According to the embodiment of the present invention, the disc of FIG. 1 is loaded in the optical data recording and reproducing apparatus shown in FIG. 2 for recording or reproducing the signal of a given sector of the track of the address number N in FIG. 2. Before a complete rotation of the disc 8 after the optical head 100 searches for the captures the track N, the reproduction light is radiated on this track N to check the quality of the sector, to determine whether or not there is a sector recorded with a signal, and to detect a sector (heading search) where the recording of a data signal supplied next is to be started. According to this method, all the sectors are checked during the first rotation of the track N and signals may be recorded in all the sectors satisfying the recording conditions of the track N. Although the average data transfer speed for signal recording is reduced to one half as compared with the case where a previous checking is effected, it is still extremely higher than in the several types of the DRAW process mentioned above.

Instead of one track, several tracks may be checked over several rotations of the disc 8 with equal effect. In this way, the number of tracks to be checked previously may be determined by the length of the data to be recorded.

Figure 3:
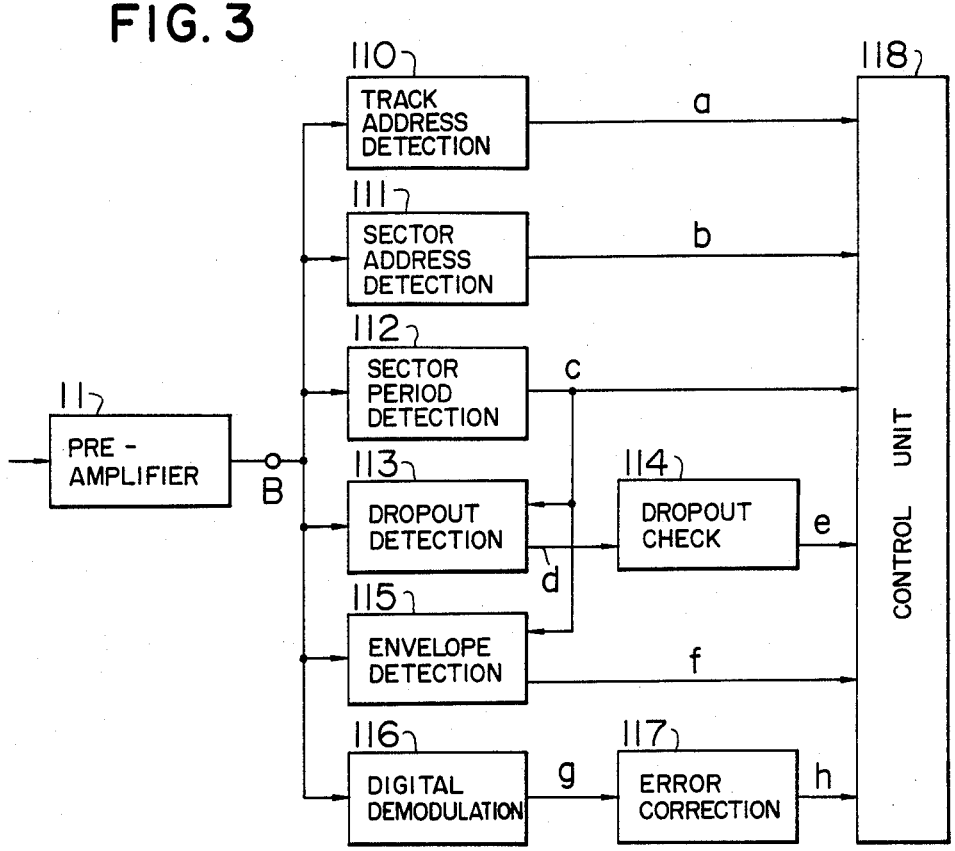
FIG. 3 is a block diagram of a reproduced signal processing circuit.

This embodiment will be described more in detail below with reference to the accompanying drawings. An example of the construction of a reproduced signal processing circuit is shown in FIG. 3. A reproduced signal (which is defined as any signal produced as an electrical signal as a result of radiating a light spot on any part of the recorded or unrecorded portion of the disc 8) from the preamplifier 11 shown in FIG. 2 is supplied to a plurality of signal processing circuits shown.

A track address detector circuit 110 is for detecting an address signal specific to each track of the disc shown in FIG. 1. Generally, the address signal N is recorded in the form of a frequency or code difference from the signals recorded in the data signal recording regions $l_1, l_2, \ldots, l_m$ or the signals representing the sector address $n_1, n_2, \ldots, n_m$. An address signal of a track is thus detected separately from the above-mentioned signals and transmitted via a line a to a control unit 118. This address signal is used for detecting a track where the recording is to be made, a track where signals are to be reproduced, or the position of the optical head.

A sector address detector circuit 111 is for detecting the address of a sector in the track captured by the optical head. In the disc shown in FIG. 1, $n_1, n_2, \ldots, n_m$ are read, and the sector number under scanning by the light beam is applied through a line b to the control unit 118. In other words, when the light beam is scanning the region $l_1$, the sector address detector circuit 111 transmits the sector address $n_1$ to the control unit 118.

A sector period detector circuit 112 is for generating a signal only during the scanning of the data recording regions $l_1, l_2, \ldots, l_m$ by the light beam. Specifically, in the data recording region $l_1$ of FIG. 1, for instance, a signal of "high" level is produced on the line c during the period from the trailing edge of the sector address $n_1$ to the leading edge of the sector address $n_2$. This signal is used for checking the data recording region $l_1, l_2, \ldots, l_m$ as to the presence or absence of any recorded signal or a defect including a dropout. This signal is also used as a gate signal for supplying a recording signal to the semiconductor laser 1 in the recording process.

A dropout detector circuit 113 is for detecting whether an impulse form of a dropout is contained in the output of the preamplifier 11. This detection is effected only during the period when the output (line c) of the sector period detector circuit 112 is at a high level, namely, only when the data recording region $l_1, l_2, \ldots, l_m$ is involved but not the track address region N or the sector address region $n_1, n_2, \ldots, n_m$. A dropout checking circuit 114 checks the duration of a dropout signal supplied to a line d, the number thereof in a sector and the rate of repetition thereof and decides whether or not a particular dropout is correctable by an error correcting circuit 117 according to a predetermined criterion, so that the result of the decision is applied through a line e to the control unit 118. The control unit 118 decides whether or not a particular sector is satisfactory in quality in response to the signal of the line e and the sector address under detection, and stores the result of the decision in the memory of the control unit 118. In the manner described above, the presence or absence of an unsatisfactory sector is determined over one or several tracks.

An envelope detector circuit 115 is for rectifying and integrating the output of the preamplifier 11 during the application of a high level signal to the line c (namely, in relation to the data recording regions $l_1, l_2, \ldots, l_m$) to check for any signal previously recorded. In the presence of a recorded signal, the output of the circuit 115 is applied to the control unit 118 through a line f. In response to this signal and the sector address under detection, the control unit 118 stores the sector containing a recorded signal as a recording-prohibited sector. This checking is conducted for each or a plurality of tracks or over a number of regions corresponding to the length of a signal to be recorded next.

A digital demodulation circuit 116 is used only during the time of reproduction of the recorded signal to reproduce the signal modulated and recorded in the optical disc, to demodulate it by use of the well-known clock reproduction technique and to apply the reproduced signal to a line g as digital data.

An error correction circuit 117 is for correcting an error in the data according to a predetermined algorithm and applying the resulting correct data to the control unit 118 through a line h. The control unit 118 includes a microprocessor or the like for controlling the whole system of the optical data recording and reproducing apparatus shown in FIG. 2, searching for a desired track, and the control of reproduction and sectors. The sector control and the recording and reproduction control will be explained below.

Figure 4:
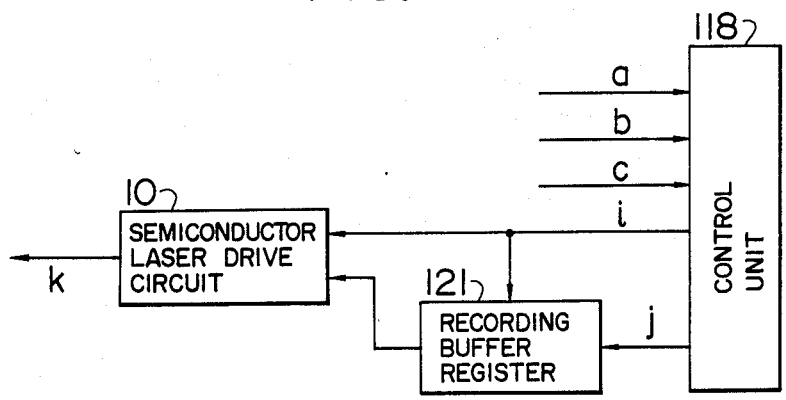
FIG. 4 is a block diagram showing a recording control system.

An example of the construction of the recording control system is shown in FIG. 4. Assume that data is recorded in the track address N of FIG. 1. In the manner mentioned above, the reproduction light beam is radiated on the track of the address N thereby to detect an unsatisfactory sector where a signal is not to be recorded, in the track of the address N, during one rotation of the disc, with the result of the detection being provisionally stored in a memory of the control unit 118. In FIG. 4, the control unit 118 constantly checks the track address, sector address and the data recording region-which are presently scanned by the light beam in accordance with the signals of the lines a, b and c (representing the same contents as the lines of the same characters in FIG. 3). The signal to be recorded from a line j into the disc is supplied to and stored provisionally in a recording buffer register 121. The quantity of the signals recorded provisionally is equivalent to one sector and may be equivalent to a plurality of sectors. Under this condition, the light beam detects the sector $n_1$, and when the light beam begins to scan the data recording region $l_1$, the sector $n_1$ being free of any defect, a recording command is issued on a line i, and a signal is applied from the recording buffer register 121 to the semiconductor laser drive circuit 10, so that a signal equivalent to one sector is recorded in the data recording region $l_1$ by intensity modulation of the output light of the semiconductor laser 1. In a similar fashion, signals are recorded in the sectors $n_2, n_3, \ldots, n_m$. In the event that the light beam arrives at a sector stored as a recording-prohibited sector in the memory of the control unit 118, on the other hand, the recording is prohibited without issuing a recording command. In this case, a signal is recorded in the next satisfactory or high quality sector to come.

In the manner mentioned above, upon recording a signal in the track of address N, the light beam transfers to the next (N+1)th track, to continue the recording of the signal in a similar fashion.

Figure 5A:
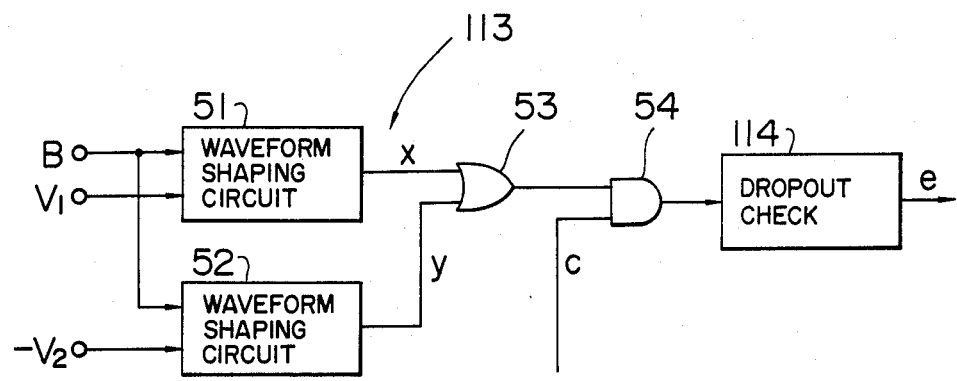
FIG. 5A is a block diagram specifically showing a dropout detector circuit.
Figure 5B:
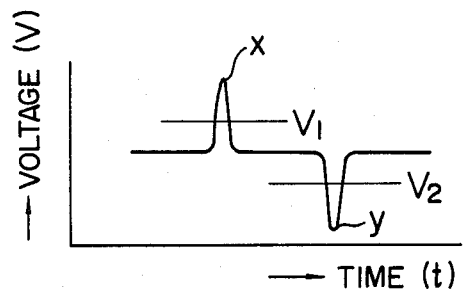
FIG. 5B shows a waveform of a dropout signal.

An example of the construction of the dropout detector circuit 113 of FIG. 3 is shown in FIG. 5A. An example of the output of the preamplifier 11 produced upon radiation of the light beam on an unrecorded portion of the disc is shown in FIG. 5B. Characters x and y designate waveforms in the presence of a dropout. A dropout of light-masking type is shown by the character x, and a dropout caused when light is reflected well is shown by the character y. In FIG. 5A, numerals 51 and 52 designate waveform-shaping circuits for comparing threshold voltages $V_1$ and $V_2$ with dropout signals x and y respectively. The waveform-shaping circuits 51 and 52 produce rectangular waves X' and Y' proportional to a difference between the voltage of the dropout signal x and the threshold voltage $V_1$ and a difference between the voltage of the dropout signal y and the threshold voltage $V_2$, respectively, when the voltage of the dropout signal x is higher than the threshold voltage $V_1$ and when the dropout signal y is lower than the threshold voltage $V_2$, respectively. Numeral 53 designates an OR gate for transmitting the output of the waveform-shaping circuit 51 or 52 to an AND gate 54. The line c is supplied with the same signal indicating a data recording region as shown in FIG. 3 so that only a dropout existing in the data recording region on the disc is applied to the dropout checking circuit 114. The dropout checking circuit 114 measures the duration, number and the frequency of the dropout in a sector and decides whether or not the dropout is correctable. The result of the decision is transmitted via the line e to the control unit 118.

FIG. 6A shows an example of the construction of the envelope detector circuit 115 for deciding whether or not a signal has already been recorded in a data recording region, and FIGS. 6B and 6C show waveforms produced at various parts thereof. An example of the reproduced signal from the preamplifier 11 is shown in FIG. 6B. Characters $n_1$, $n_2$ and $n_3$ designate the above-mentioned sector addresses. Character $l_1$ designates a data recording region where a signal is already recorded, and character $l_2$ a data recording region not yet recorded with any signal. A rectifier-integrator 61 operates only when a signal indicating a data recording region is supplied thereto from line c. In response to the signal of FIG. 6B, only the signals existing in the data recording regions $l_1$ and $l_2$ are rectified and integrated as shown in FIG. 6C and applied to a line p. A shaping circuit 62 is for comparing a threshold voltage $V_3$ with the output of the line p, and applies the output thereof to the control unit 118 through the line f.

The dropout detector circuit 113 and the envelope detector circuit 115 are used also for searching for a sector where a signal is to be recorded, when recording a new signal with the light beam entering the track of, e.g., the address N. The number of the sector where the recording is to be started is supplied to and stored in a file control unit or the like for subsequent search for a recording signal.

The above relates to a method of assuring the quality of the recording signal for recording or reproducing a signal in an optical disc having a sector construction and a method of preventing a signal from being doubly recorded on a recorded signal. As compared with the method in which signals for one sector are recorded and reproduced, and after confirming the recording quality thereof, if the quality is unsatisfactory, the same signal is rewritten in the next sector, the above-mentioned method results in an extreme increase in the speed of the recording signal transfer. Also the head search of a recorded sector is facilitated, and the method is effective in recording and reproducing signals of different contents in different sectors. Further, a signal is prevented from being recorded in double fashion on another recorded signal.

As described above, the optical data recording and reproducing apparatus of the present invention, wherein digital data are recorded in an optical recording disc having an address signal region, a sector address region and a data recording region on the one hand, and the digital data are reproduced from the optical recording disc on the other hand, comprises a light source, a light radiator means for reducing the output light of the light source to a very small diameter and radiating the light on the optical recording disc, recording-reproducing means for recording and reproducing the digital data by the recording light and the reproducing light of the light radiator means, recording-prohibited sector detector means for radiating the reproducing light on the optical recording disc immediately before the recording of the digital data thereby to check each sector of the data recording region to be recorded with the digital data, the recording-prohibited sector detector means producing an output upon detection of a recording-prohibited sector, recording-prohibited sector memory means for storing the sector address involved at least until the digital data begins to be recorded in the optical recording disc, in response to the output of the recording-prohibited sector detector means, comparator means for comparing the sector address of the recording-prohibited sector stored in the recording-prohibited sector memory means with the sector address constantly read out of the optical recording disc, and recording signal output prohibiter means for prohibiting the output of the recording signal from the light source and holding the recording signal until the next sector in response to a coincidence signal produced from the comparator means. By checking each sector in advance in this way, the recording quality is assured and the recording and reproducing operations are performed without reducing the average data transfer speed at the same time. Also, the checking of sectors prevents double recording by detecting a recorded sector. Further, a sector where the recording of new data is to be started is detected.

A second embodiment of the present invention will be explained below with reference to the accompanying drawings. This embodiment, which is used with a dropout checking device, is such that the number of dropouts in a track where recorded sectors and unrecorded sectors coexist is accurately detected thereby to assure the recording quality and prevent undue reduction of the sector recording rate of the optical recording disc at the same time.

FIG. 7 shows a block diagram of an embodiment of the dropout detector circuit (113 in FIG. 3).

A reproduced signal B produced from a preamplifier 11, after being amplified at an amplifier 12, is applied to a first clamp circuit 13, an inverting amplifier 15 having a gain of 1, and a second clamp circuit 16. The output C of the first clamp and the output D of the second clamp clamped at the respective clamp circuits are digitized by a threshold voltage G of a threshold voltage generator circuit 18 at comparators 14 and 17 respectively. A digitized output E of the first clamp and a digitized output F of the second clamp are applied to a dropout counting circuit 21 as a signal H free of a spurious signal caused in the clamp circuits 13 and 16 and removed by a clamp compensator circuit 19 described later with reference to FIG. 11, and then the length and number of the dropouts are accumulated by a clock pulse K at a clock generator circuit 20. The output J of the dropout counting circuit 21 is applied to the control unit 118 to decide whether or not an unsatisfactory sector is involved.

Figure 8:
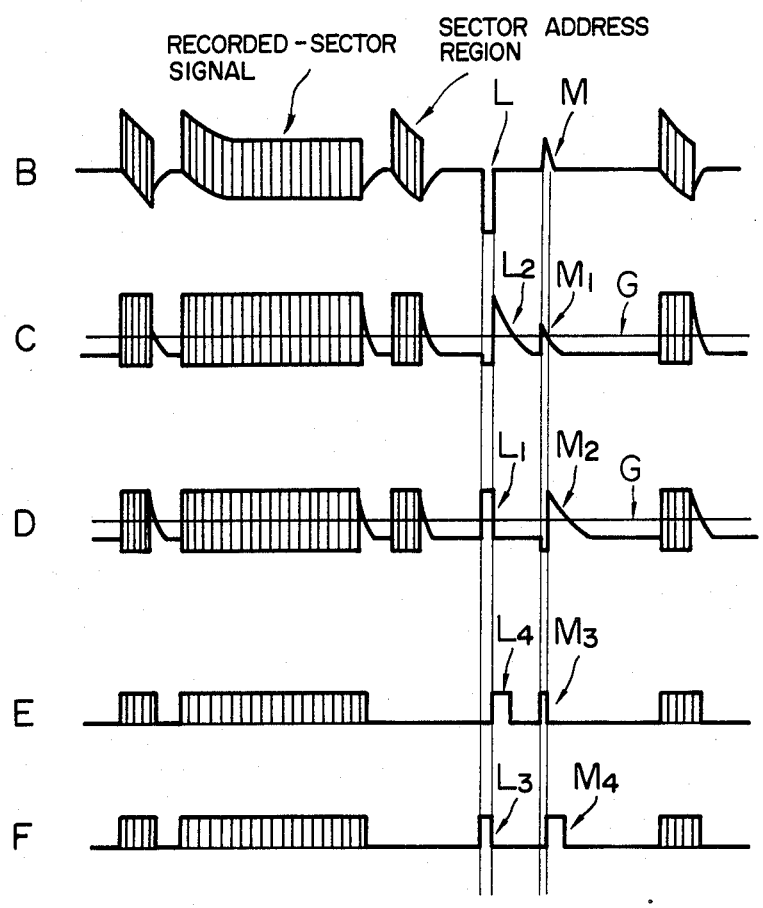
FIG. 8 shows signal waveforms produced at various parts.
Figure 9:
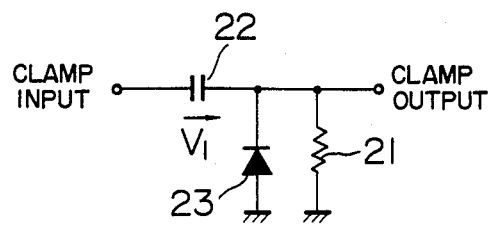
FIG. 9 shows an example of the construction of a clamp circuit.
Figure 10:
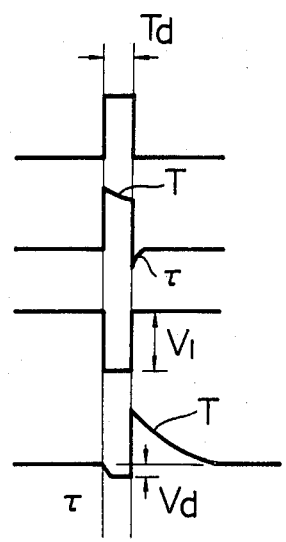
FIG. 10 shows waveforms of the clamp inputs and clamp outputs of the clamp circuit of FIG. 9.

FIG. 8 shows waveforms produced at various parts of FIG. 7. The reproduced signal B has zags as shown at B in FIG. 8 as a result of a loss of the DC signal component contained in the track address region, the sector address region or the recorded sector signal in view of the relation of the frequency band of the preamplifier 11. The clamp circuits are necessary to remove these zags. The reproduced signal B has two types of dropouts, a dropout L with a reduced signal amplitude, and a dropout M with an increased signal amplitude. The clamp circuits 13, 16 each comprise a capacitor 22, a diode 23 and a resistor 21 as shown in FIG. 9. FIG. 10 shows clamp output waveforms responsive to the clamp inputs applied to the clamp circuits of FIG. 9. As shown at (i) and (ii) in FIG. 10, when an input is applied to the diode in the non-conducting direction, the input is clamped to 0 volt substantially exactly. When the diode is supplied with an input in forward direction as shown at (iii) and (iv) in FIGS. 10, on the other hand, the diode 23 charges the capacitor 22 for a pulse duration Td, so that an input crest voltage $V_1$ is generated at the terminal thereof, and the instant the input pulse is reduced to 0 volts, a spurious voltage waveform shown at (iv) in FIG. 10 is generated. This voltage waveform discharges at a time constant T obtained by multiplying the capacitance of the capacitor 22 by the resistance value of the resistor 21. This time constant is more than ten times larger than the time constant $\tau$ which is the product of the forward resistance value of the diode 23 and the capacitance of the capacitor 22. At C to F in FIGS. 8, the dropouts L and M have different polarities, and therefore spurious voltage waveforms L2 and M2 similar to those shown in FIG. 10 are generated. Waveforms L1 and M1 represent intended clamp output waveforms. When digitization is made by the threshold voltage G at C and at D in FIG. 8, the intended digitized outputs L3 and M3 and the spurious digitized outputs L4 and M4 are produced as shown at E and F in FIG. 8. Unless the time constant T of the clamp circuits 13 and 16 is larger than the duration Td by one order, the pulse crest of the first clamp output at (ii) of FIG. 10 is accompanied by a large zag. If so, the spurious pulse is much longer than the true dropout duration, resulting in very inaccurate detection of the duration and length of the dropout. The clamp compensator circuit 19 is for detecting a spurious voltage and a spurious pulse to reproduce an accurate dropout pulse duration, and is shown in FIG. 11.

Figure 11:
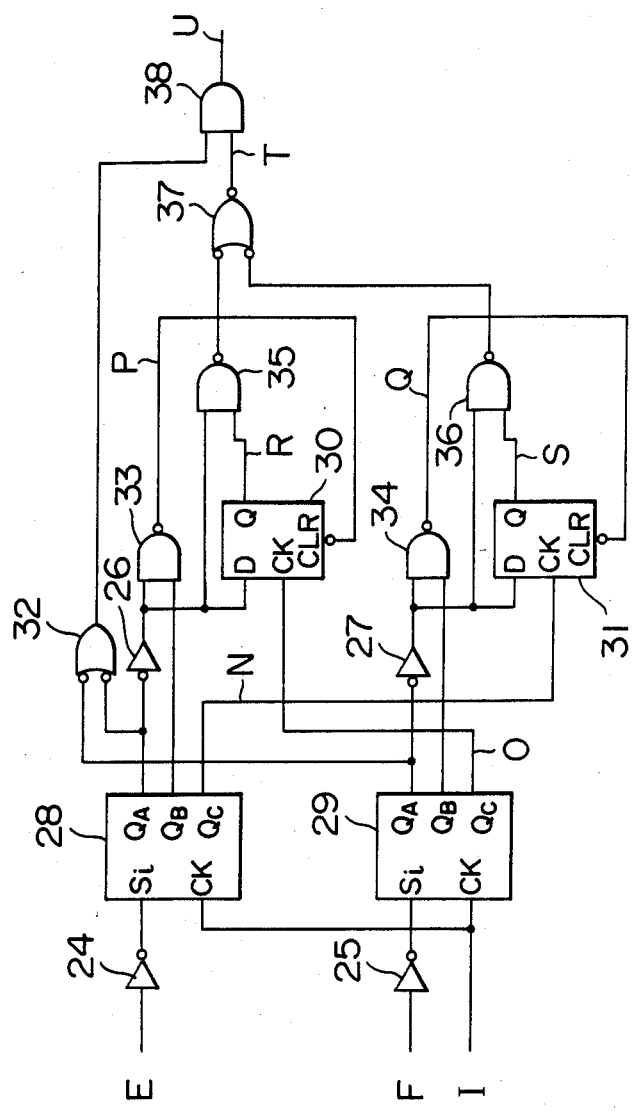
FIG. 11 is a diagram showing an example of the construction of a clamp compensator circuit.

In FIG. 11, numerals 24, 25 and 26 designate inverters, numerals 28, 29 shift registers (such as SN74 LSI64 of TU), numerals 30, 31 D-type latches (such as SN74LS74 of TU), and numerals 32, 33, 34, 35, 36 2-input NAND circuits, and numerals 37, 38 2-input AND circuits.

Figure 12:
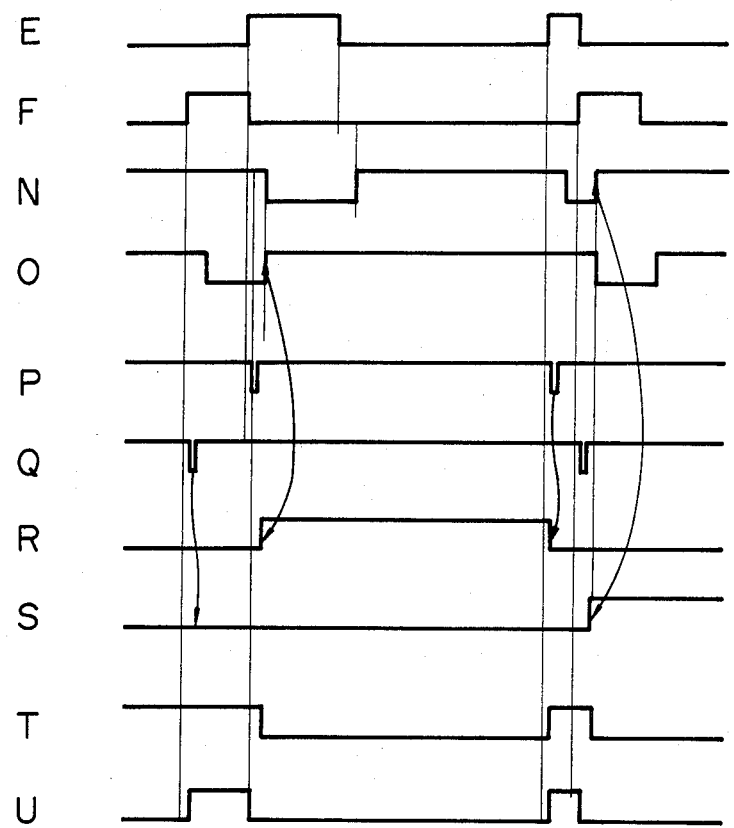
FIG. 12 is a timing chart of the signals produced at various parts in FIG. 11.

FIG. 12 shows a timing chart of the signals produced at various parts. The same reference numerals in FIGS. 7, 8, 11 and 12 designate the same component elements therein.

The digitized output of the first clamp, after being inverted by the inverter 24, is applied at the timing of a clock I to the shift register 28. Similarly, the digitized output F of the second clamp is inverted at the inverter 25 and applied to the shift register 29 at the timing of the clock I. The output $Q_A$ of the shift register 28, after being inverted at the inverter 26, is applied to the terminal D of the D latch 30, and is latched by the rise of the trailing edge of the output $\bar{O}$ of the shift register 29. The output R of this latch 30 represents the period during which the superious pulse of the digitized output E of the first clamp exists, and is reset by the rise edge pulse of the digitized outpuc E of the first clamp. The rise edge pulse P is produced by the shift outputs $Q_A$, $Q_B$ of the shift register 28, the inverter 26 and the NAND 33.

The output $Q_A$ of the shift register 29 in response to the digitized output F of the second clamp, on the other hand, after being inverted at the inverter 27, is applied to the terminal D of the D latch 31 and is latched at the rise of the shift output N of the shift register 28. The output S of the D latch 31 represents the spurious pulse output period of the digitized output of the second clamp and is reset by the rise edge pulse Q of the digitized output of the second clamp. The rise edge pulse Q is produced by the shift outputs $Q_A$, $Q_B$ of the shift register 29 and the inverter 27 and the NAND 34.

The shift outputs $Q_A$, $Q_B$ and $Q_C$ of the shift registers 28 and 29 correspond to the first, second and third stages respectively, and the outputs thereof are delayed from one another by the period of the clock I.

The spurious pulse is produced when both the digitized output E of the first clamp and the output R of the D latch 30 are "1" or when the digitized output F of the second clamp and the output S of the D latch 31 are both "1". Although in the embodiment under consideration the first-stage output $Q_A$ of the shift registers 28 and 29 is used instead of the digitized outputs E and F, there is no substantial difference except for the difference of one-pulse period otherwise. The third stage output ($Q_C$) N and $\bar{O}$ of the shift registers 28, 29 are such that, in view of the difference of time delay between the clamp circuits 13, 16 and the comparators 14, 17, the digitized outputs E and F are delayed two pulses by the clock I thereby to make the detection of the spurious pulse accurate. As a result, the decomposing time between the dropouts and the dropout length of course contain an error of two pulses by the clock I. Nevertheless, the accuracy is much higher than when the spurious pulse is disregarded.

The digitized output E of the first clamp and the digitized output F of the second clamp are added to each other at the NAND gate 32, and the resultant output of the NAND gate 32 is added to the spurious pulse detection signal T at the AND gate 38 thereby to produce a compensated dropout output U. The spurious pulse detection signal T is obtained at the AND gate 37 as the logic product of the output of the NAND gate 35 obtained from the output R of the D latch 30 and the inverted output of the first-stage output $Q_A$ of the shift register 28 on one part and the output of the NAND gate 36 obtained from the inverted output of the first-stage output $Q_A$ of the shift register 29 and the output S of the D latch 31 on the other part. When the spurious detection signal T is "low", the detection of a spurious pulse is indicated.

As seen from the foregoing description, in a clamp circuit in which a clamp diode is turned on upon application of positive and negative clamp inputs to the positive and negative clamp circuits, a voltage thus far charged in a clamp capacitor is discharged as a clamp output the instant the clamp diode is turned off upon cessation of the clamp input, thus producing a large spurious voltage. The clamp compensator circuit of FIG. 11 operates to detect and kill the clamp output following the trailing edge of the output of the positive clamp circuit or the output of the negative clamp circuit.

In the above-mentioned second embodiment, in the event that recorded sectors and unrecorded sectors coexist in a given track to cause a large zag in the reproduced signal, or in the presence of variations of the reflection factor of the optical disc to cause an amplitude variation in the reproduced signal, these zag and amplitude variation in the reproduced signal are absorbed by the clamp circuit, thereby making possible satisfactory dropout detection.

Further, according to the embodiment under consideration, assume that a dropout is one causing an increase of the output level of the reproduced signal (such as the recording material of the optical disc or the shape of the groove of the guide track which increases the amount of reflected light) or one causing a decrease of the output level thereof (such as a pinhole or dust). A spurious clamp output resulting from the clamping at the clamp circuit is detected and is compensated, thus detecting the amount and length of the dropout accurately.

A third embodiment of the present invention will be described below with reference to the accompanying drawings. This embodiment provides a function of accurately detecting any form of dropout which makes defective the signal recorded in the optical recording disc.

Figure 13:
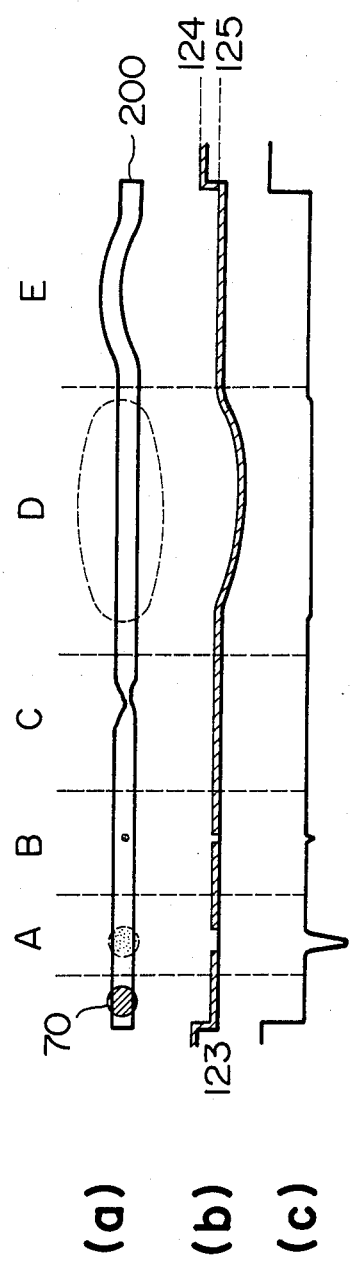

As shown in FIG. 3, the configuration in which the dropout is detected only by the reproduced signal B cannot detect any dropout completely which adversely affects the recording signal. This will be explained by reference to FIG. 13. FIG. 13 illustrates several forms of dropout which actually adversely affects the recording signal.

FIG. 13 at (a) shows a groove-shaped guide track 1 with part of the data recording region 1 illustrated in enlarged form. The groove has a width of 0.5 to 1 μm. FIG. 13 at (b) shows a sectional view of the guide track of (a) in FIG. 13 taken parallel with the track 200. Numeral 124 designates a flat portion between grooves, and numeral 125 the level of the groove bottom, the surface of which is vapor-deposited with the recording material. FIG. 13 at (c) shows an output waveform of the reproduced signal obtained when the guide track is subjected to tracking control as shown at (a) and (b) in FIGS. 13. The dropouts adversely affecting the recording signal are of five types A to E. The type A is called the pinhole, which represents the part of the groove-shaped guide track 200 where the recording material 201 is not vapor-deposited. The reflection factor is reduced at the part where the pinhole is present. A pinhole is caused by a small flaw or hole on the disc substrate 23 or by such foreign matter as dust which attaches at the time of vapor deposition or by variations of the deposited material. Numeral 70 designates the size of the small light spot tracking along the guide track. In the case where the pinhole is larger than the minute spot light as in type A, a dropout of a sufficiently large output is detected in the reproduced signal. The change of all the amount of the reflected light from the optical recording disc is detected as a reproduced signal for detecting the change of the reflection factor of the recording material. In the event that the pinhole is smaller than the minute spot light as in type B, however, the dropout is not substantially produced in the output of the reproduced signal. This is on account of the fact that the change of the reflection factor is not sufficiently detected unless the minute spot light is of such a magnitude as to be contained completely in the pinhole. The minute dropout like B leads to a defect in the recording signal, thus causing a demodulation error thereof.

The dropout of type C is caused by the defect of the guide track on the substrate or an unsatisfactory groove shape attributable to the surface irregularity of the master or cutting noises or foreign matters attached at the time of stamping.

The dropout of type D, on the other hand, is derived from a hole or dent on the disc substrate or a defect of the substrate. This dropout has a high frequency component which cannot be followed by focus control. The dropout of type E is caused when the groove-shaped guide track is displaced from a concentric circle or a spiral, and is generated by vibrations during cutting or unsatisfactory pressure during stamping. The above-mentioned dropouts of types B to E, though adversely affecting the recording signal, have so far been incapable of being detected from the reproduced signal alone.

A third embodiment is intended to solve this problem, and the object thereof is to detect all the forms of dropout adversely affecting the recording signal recorded in the optical recording disc and to effect precheck recording by determining an inferior sector on the basis of the ability of error correction after demodulation, thereby reducing the error rate after demodulation.

According to the present invention, not only a dropout is detected from the reproduced signal but also the light reflected from or transmitted through the optical recording disc is received by a light detector having split planes in directions perpendicular and parallel to the guide track. The difference signal produced from the light detector and the focus error signal produced for focussing the minute spot light on the optical recording disc are used to detect a dropout. In the optical data recording and reproducing apparatus having this construction, a dropout of any form in the optical recording disc is capable of being detected, and an unsatisfactory sector may be detected accurately, thus reducing the error rate after demodulation. This invention is indispensable for assuring the recording quality of the optical recording disc.

FIG. 14 shows the construction of an optical system of the optical data recording and reproducing apparatus according to a third embodiment of the present invention. The light beam radiated from the semiconductor laser 1 is condensed by the condensing lens 2 and, through a beam splitter 128 and a λ/4 plate 129, is radiated as a minute spot light on the optical disc 8 by the stop lens 5. The optical disc 8 is driven by a disc motor 7. The light reflected from the optical disc, which is changed in polarization by the λ/4 plate 129, is separated by the beam splitter 128. Further, the light beam is split by the convex lens 131 and the split mirror 132 to be received by a focus detector 133 and a tracking detector 134 separately.

FIGS. 15a and 15b show a configuration of the light-receiving elements of the focus detector 133 and the tracking detector 134 and the relative positions thereof with the guide track 200. The focus detector 133 is provided with split light detectors F1 and F2 at the focussing point of the reflected light. The tracking detector 134, on the other hand, includes four split light detectors T1 to T4 in a manner to provide split planes parallel to and perpendicular to the guide track 200 for the far field pattern of the relfected light.

FIG. 16 shows a configuration of the signal processing section of the optical data recording and reproducing apparatus according to the present invention.

FIG. 17 shows signal waveforms produced at various points c to f in FIG. 16. Numeral 135 designates a high frequency amplifier for producing a change of the entire amount of reflected light from the optical recording disc 8. This output (c), after being shaped at a shaping circuit 136a, is used as a reproduced signal for track address detection at 110, dropout inspection at 114a and digital demodulation of the recording signal at 116 as in the conventional case (FIG. 3). The waveform shaping circuit 136a uses a positive threshold value 137a and a negative threshold value 137b as shown at (c) in FIG. 17 for comparison and produces a pulse waveform. The dropout of type A caused by the lack of vapor deposition of the recording material is generally called a pinhole as mentioned above. In this case, the reflected light from the optical disc is reduced and therefore the signal waveform as shown by 138b results. Conversely, in the presence of the dropout of type A', the reflection factor increases, probably on account of a variation of vapor deposition or attachment of impurities. This is effective only for detecting a dropout characterized by a large variation of the reflection factor on th disc surface. Actually, there are various dropouts affecting the recording signal in the optical recording disc. In FIG. 16, numerals 139a and 139b designate sum amplifiers and numeral 140a designates a differential amplifier for producing an error signal between the outputs of the two sum amplifiers 139a and 139b. The resulting output is $(T_1+T_3)-(T_2+T_4)$, which is the difference between the two split light detectors having split planes perpendicular to the guide track shown in FIG. 15(b). This output (d) represents the roughness of the groove-shaped guide track and obtained from the diffracted image of the reflected light capable of being detected with high S/N ratio in the case of cutting of the sector address or the like. According to the embodiment under consideration, therefore, the output (d) is used for detection of the sector address at 111 after being shaped at the waveform shaping circuit 136b. It is also used for dropout detection at 114b. The dropout of type A shown in FIG. 17, which is caused by an extreme reduction of the envelope of the recording signal for the deterioration of the groove shape of the guide track 200, is incapable of being demodulated. Although the groove changes in shape, the change of the total reflection factor is not substantially detected so that the dropout of type C is not detectable only by the reproduced signal (c). The output (d) is produced by the two-split-light detector having a split plane perpendicular to the groove-shaped guide track, and receiving the far field pattern from the groove-shaped guide track 200, detects the change of the diffracted image parallel to the groove-shaped guide track with high S/N ratio. In the presence of a change of the groove shape as in type C, therefore, the diffracted image of the reflected light thereof changes, thereby causing a change in the distribution of the quality of light on the far field pattern received at the light detector. The output (d) is compared with the threshold values 146a and 146b and used for dropout inspection. As described above, the present invention is characterized in that the dropout of type C is also capable of being detected accurately.

The dropout of type B is a pinhole smaller than the diameter of the minute spot light 70. When this small pinhole is radiated with the minute spot light, the minute spot light is applied both to the normal portion vapor-deposited with the recording material and to the pinhole at the same time. Thus, as shown by 141, only a small change of the reflection factor is detected, and as shown in 138b, the threshold level is not reached, thus making detection impossible. Unless the minute spot light is of such a size as to be contained completely in the pinhole (as A or A'), the change of the reflection factor cannot be fully detected. By the output (d) which is produced differentially as a change of the quantity of light in the direction parallel to the groove-shaped guide track, however, even a change of the reflection factor smaller than the size of the minute spot light is detectable as shown by 142 in FIG. 17. The light received by the focus detector 133 is subjected to a focus control at 143 such that the focus error signal (e) of $(F_1-F_2)$ is produced from the differential output of the two split light detectors $F_1$ and $F_2$ and is used for control of the optical pickup 145 to form a focussing point on the surface of the optical recording disc 2. The tracking detectors $T_1$ to $T_4$ produce an output (f) in the form of $(T_1+T_2)-(T_3+T_4)$ through the sum amplifiers 139c, 139d and the differential amplifier 140b. The output (f), which is a differential output of the two split light detectors having a split plane parallel to the guide track, provides a tracking error signal, which controls the tilting of the optical pickup 145 thereby to effect the tracking control 143 to the desired track. The groove-portion of the optical recording disc is made of such a material as a resin hardened by ultraviolet rays and has a defect of a hole, a dent or a recess more than several tens of μm. This is caused by the pressure strain applied at the time of stamping or by foreign matter attached thereto. The result is a dropout of type D, the size of which, if about several tens of μm, makes up a frequency component incapable of being followed by the focus control. Therefore, a defocussed condition occurs resulting in a decrease of the recording envelope at the portion where the dropout of type D occurs. At the dropout of type D also, the change of the reflection factor is not substantially detected, so that the detection of the dropout is impossible only by the reproduced signal (c). Since the dropout of type D involves a defocused condition as mentioned above, however, it is detected as a control error on the focus error signal (e). Generally, a dropout of type D occurs in a burst and has a long duration, thus causing a decrease of the recording envelope over a large range. This greatly deteriorates the recording quality. In pre-check recording, the detection of the dropout of type D is indispensable. The focus error signal (e) is compared with the threshold value 147d and after being shaped at the shaping circuit 136d, is used for dropout checking at 114d. Finally, the dropout of type E occurs by pressure strain at the time of stamping or by vibration at the time of cutting the guide groove with the guide track 200 displaced from a concentric or spiral track. In this case, too, as in the case of focus control, if the displacement is out of the controllable frequency characteristics, a tracking control error occurs, thereby making it impossible to radiate the minute spot light accurately on the guide track. As a result, a decrease of the recording envelope is caused, thereby leading to the situation where demodulation is impossible. This dropout of type E also accompanies no substantial change of the total amount of reflected light and therefore is undetectable only with the reproduced signal (c). In view of the fact that a control error occurs at the dropout portion of type E as described above, however, it may be detected on the tracking error signal (f). By shaping the output (f) and using it for dropout inspection at 114c, an accurate pre-check recording is possible.

The dropout detection signals are thus classified into types (c) and (d) which are used for dropout inspection with the open loop signal of the output of the light detector, and types (e) and (f) which are employed for dropout detection by use of the control error signal in the control loop.

It will be understood from the foregoing description that according to the present invention, any form of dropout (A to E types) which causes a decrease of the envelope of the recording-reproduction signal leading to a demodulation error are accurately detected, thus making possible a pre-check recording of high reliability. The control unit 118 is supplied with the result of the dropout inspection as data and on the basis of the possibility of error correction determines a sector where recording is to be skipped, so that digital modulation is suspended in the particular sector and the recording signal is prevented from being applied to the semiconductor laser circuit while at the same time preventing the semiconductor laser from producing recordable light power.

As described above, the dropout of type D detected on the focus error (e) and the dropout of type E detected on the tracking error (f) are very harmful as they reduce the recording envelope in a burst. If even a single dropout of type D or E occurs in a sector, the particular sector may be determined as an unsatisfactory sector. As to the dropouts of types A, B and C, on the other hand, only those dropouts of bit length where an error may be correctable are determined as recordable.

Although the embodiments are described above as limited to the detection of the reflected light from the optical recording disc, the detection output of the light transmitted through the optical recording disc may be used of course with equal effect.

According to the present invention, there is provided an optical data recording and reproducing apparatus, in which a harmful dropout causing a decrease of the envelope of the recording-reproduction signal and a demodulation error is detected from a reproduced signal by detecting the change of the total amount of light reflected from the optical recording disc and, at the same time, the reflected light from the optical recording disc is received by a light detector having split planes perpendicular and parallel to the guide track so that both the difference signals of the outputs of the two split light detectors and the focus error signal obtained from the focussing of the minute spot light on the optical recording disc are used for dropout detection. According to the present invention, dropouts of any form on the optical recording disc are detectable accurately, and therefore it is possible to accurately determine an unsatisfactory sector in pre-check recording, thereby reducing the error rate after demodulation.

The present invention is indispensable for assuring the recording quality of the optical recording disc, and extremely improves the reliability of the optical data recording and reproducing apparatus.

I claim:

1. An optical data recording and reproducing apparatus for recording digital data in a recording track on an optical recording disc having an address signal region, a sector address region for addressing sectors of said recording track and a data recording region, and for reproducing the digital data from said optical recording disc, comprising:

a light source, light illuminating means for condensing an output light beam from said light source to produce a condensed output light beam having a very small diameter and for illuminating said optical recording disc with said condensed output light beam, recording-reproducing means for recording and reproducing said digital data by a recording light beam and a reproducing light beam from said light illuminating means, respectively, dropout detecting and inspecting means for scanning said data recording region with said reproducing light beam to detect a presence of a dropout therein, inspecting a condition of a detected dropout, and producing an output signal upon determining a presence of a dropout which is determined to give rise to an error after a demodulation of a signal reproduced by said recording-reproducing means, recording-prohibited sector detector means for producing an output signal identifying a recording-prohibited sector where recording is prohibited responsive to said output signal from said dropout detecting and inspecting means, recording-prohibited sector memory means for storing a sector address of said recording-prohibited sector in response to the output signal of said recording-prohibited sector detector means at least until recording of said digital data in said recording track on said optical recording disc is begun, comparator means for comparing the sector address of said recording-prohibited sector stored in said recording-prohibited sector memory means with a sector address read constantly from said optical recording disc, and recording output prohibiting means for prohibiting an output of the recording light beam from said light illuminating means in response to a coincidence output signal from said comparator means and holding said digital data to be recorded until the next sector is encountered on said optical recording disc.

2. An optical data recording and reproducing apparatus according to claim 1, wherein a length of the data recording region where a recording-prohibited sector is detected each time is not shorter than a length of the data recording region included in one revolution of said optical recording disc.

3. An optical data recording and reproducing apparatus according to claim 1, wherein a length of the data recording region where a recording-prohibited sector is detected each time is determined by a length of the digital data to be recorded the next time.

4. An optical data recording and reproducing apparatus according to claim 1, further comprising error correcting means and wherein said dropout detecting and inspecting means measures a duration of a dropout, a number of dropouts in a sector and a frequency of generation thereof, and determines whether a sector should be prohibited from recording on the basis of a possibility of correction of the reproduced signal by said error correcting means.

5. An optical data recording and reproducing apparatus according to claim 1, wherein said dropout detecting and inspecting means comprises envelope detector means for scanning said data recording region with a reproducing light, determining whether an envelope of a recorded signal is contained therein, and producing an output in a presence of a recorded sector.

6. An optical data recording and reproducing apparatus according to claim 1, further comprising a first clamp circuit for clamping said dropout signal and a second clamp circuit opposite in polarity to said first clamp circuit, wherein a dropout in said data recording region is detected by means for digitizing an output of said first and second clamp circuits by a predetermined threshold voltage and means for counting a duration of said digitized output.

7. An optical data recording and reproducing apparatus according to claim 1, further comprising means for delaying a first digitized output of said first clamp circuit and a second digitized output of said second clamp circuit, and means for detecting a superposition between a trailing edge of a delayed output of said first digitized output and said second digitized output and a superposition between a trailing edge of a delayed output of said second digitized output and said first digitized output, thereby dampening spurious output generated by discharge of a clamp capacitor at a trailing edge of a dropout occurring in a forward direction of a clamp element of said first and second clamp circuits.

8. An optical data recording and reproducing apparatus according to claim 1, wherein said dropout detecting and inspecting means produces a said output signal such that a selected one of the light reflected on and transmitted through said optical recording disc is received by a light detector having at least two split planes, and the data recording region is checked for a dropout from at least one of a difference signal and a sum signal of an output of said light detector.

9. An optical data recording and reproducing apparatus according to claim 8, wherein a far field pattern of a selected one of light reflected on and light transmitted through said optical recording disc is received by a second light detector having a split plane perpendicular to a selected one of a concentric track and a spiral track, said apparatus further comprising means for checking said data recording region for a dropout from a difference signal produced from said second light detector.

10. An optical data recording and reproducing apparatus according to claim 8, wherein a far field pattern of a selected one of light reflected on and light transmitted through said optical recording disc is received by a second light detector having a split plane parallel to a selected one of a concentric track and a spiral track, said apparatus further comprising means for checking said data recording region for a dropout from a difference signal produced from said second light detector.

11. An optical data recording and reproducing apparatus according to claim 8, further comprising focus control means for constantly forming an image of a minute spot light on the optical recording disc, and means for checking said data recording region for a dropout from a focus error signal detected from said light detector for focus control.

* * * * *